United States Patent
Uhm

(10) Patent No.: US 8,436,901 B2
(45) Date of Patent: May 7, 2013

(54) FIELD MONITORING SYSTEM USING A MOBILE TERMINAL AND METHOD THEREOF

(75) Inventor: Hyun Duk Uhm, Seoul (KR)

(73) Assignee: ID. Fone Co., Ltd., Seoul (KR)

( * ) Notice: Subject to any disclaimer, the term of this patent is extended or adjusted under 35 U.S.C. 154(b) by 378 days.

(21) Appl. No.: 12/918,812

(22) PCT Filed: Feb. 20, 2009

(86) PCT No.: PCT/KR2009/000819
§ 371 (c)(1),
(2), (4) Date: Aug. 27, 2010

(87) PCT Pub. No.: WO2009/104923
PCT Pub. Date: Aug. 27, 2009

(65) Prior Publication Data
US 2011/0001795 A1  Jan. 6, 2011

(30) Foreign Application Priority Data
Feb. 21, 2008 (KR) .................. 10-2008-0015909

(51) Int. Cl.
*H04N 7/12* (2006.01)
(52) U.S. Cl.
USPC .......... 348/143; 348/148; 348/149; 348/158; 348/159
(58) Field of Classification Search ............. 348/143, 348/148, 149, 158, 159
See application file for complete search history.

(56) References Cited

U.S. PATENT DOCUMENTS
6,587,784 B1 * 7/2003 Okude et al. ................ 701/454
RE41,175 E * 3/2010 Vashisth et al. ......... 342/357.31

FOREIGN PATENT DOCUMENTS
KR  1020050078136  8/2005
KR  1020060065920  6/2006
KR  1020070039803  4/2007

OTHER PUBLICATIONS

International Search Report of International Application PCT/KR2009/000819 mailed Oct. 6, 2009.
English Abstract of KR 1020050078136.
English Abstract of KR 1020060065920.
English Abstract of KR 1020070039803.

* cited by examiner

*Primary Examiner* — Sath V Perungavoor
*Assistant Examiner* — Geepy Pe
(74) *Attorney, Agent, or Firm* — Rabin & Berdo, P.C.

(57) ABSTRACT

A field monitoring system using a mobile terminal includes at least one mobile terminal which transmits situation information including video information, audio information and location information and receives three-dimensional (3D) image information corresponding to the situation information, and a control server which receives the situation information from the mobile terminal, generates 3D image information about a current location of the mobile terminal by matching the location information of the situation information with pre-stored map information or architectural drawing information, and transmits the 3D image information to the mobile terminal. The video and audio information is generated by capturing video and sound of a field, and the location information is generated by integrating signals sensed by an accelerometer and a gyroscope sensor with a Global Positioning System (GPS) signal including latitude, longitude and time.

8 Claims, 3 Drawing Sheets

FIELD MONITORING SYSTEM USING A MOBILE TERMINAL AND METHOD THEREOF

CROSS-REFERENCE TO RELATED APPLICATIONS

The present application is a national stage application under 35 U.S.C. §371 of International Application No. PCT/KR2009/000819 with an international filing date of Feb. 20, 2009, and claims priority to KR10-2008-0015909 filed Feb. 21, 2008.

BACKGROUND OF THE INVENTION

1. Field of the Invention

The present invention relates, in general, to a field monitoring system using a mobile terminal, and more particularly, to a field monitoring system using a mobile terminal, which can generate video and/or audio information and location information and can transmit the video and/or audio information and the location information to a control server via wireless communication at a scene of an incident or an accident that may occur during on-duty time of a personnel member of public institutions such as armies, the police, fire departments and security companies, and which can be compatible with or can replace a conventional fixed capturing device mounted on vehicles of armies, the police, fire departments, and security companies, thus, in the event of the incident or the accident, being able to capture the scene of the incident or the accident during a period from a time when the personnel member boards the vehicle to a time when the incident or the accident is cleared.

2. Description of the Related Art

In a conventional technology, monitoring of a field in which an incident or an accident occurs during the performance of work by a personnel member of public institutions such as armies, the police, fire departments, and security companies is heavily dependent on radio communication with the personnel member located in the field, or an aural or documentary report made by the personnel member. Further, for purpose of collecting evidential data, conventional technology utilizes a fixed capturing device mounted on a vehicle, or a technical personnel such as video recording crew to capture a scene of the incident or the accident.

However, the conventional technology is disadvantageous in that, in an emergency situation that may occur unexpectedly to the technical personnel sent to the scene of accident, the detection of a current situation by a control center may be delayed, and it is difficult for members in the field and members in the control center to agree with each other, and detecting locations of individual members in the field is difficult when the area of the incident or the accident is wide and a plurality of members are sent into the field.

Further, it is difficult to capture an image or video of the scene of the incident or the accident for recordation due to, for example, the occurrence of unexpected events, insufficient number of the technical personnel, and the presence of blind spots created by spatial limitations such as side streets or indoor areas.

SUMMARY OF THE INVENTION

Accordingly, the present invention has been made keeping in mind the above problems occurring in the prior art, and an object of the present invention is to provide a field monitoring system using a mobile terminal, which allows a control center to promptly detect the current situation of a field via the transmission of video captured in real time in an emergency situation that may occur unexpectedly to members located in the field, and which can be compatible with or can replace a conventional fixed capturing device mounted on each of vehicles of public institutions such as armies, the police, fire departments, and security companies, thus enabling continuous recording of the situation of the field of an incident or an accident.

Another object of the present invention is to provide a field monitoring system using a mobile terminal, in which mobile terminals, each employing a commercialized communication module, a Global Positioning System (GPS), and an Inertial Navigation System (INS), are provided to respective members sent into the field of an incident or accident, thus detecting the locations of individual members even in a case for the incident or the accident that occurs in a wide expanse of area, and enabling handling of an unexpected situation and capturing blind spots created by a limited number of capturing members and spatial limitations of the field where the incident or accident occurs.

In order to accomplish the above objects, the present invention provides a field monitoring system using a mobile terminal, the system comprising the mobile terminal configured to transmit situation information which includes video and/or audio information and location information, the video and/or audio information being generated by capturing video and/or sound of a field, and the location information being generated by integrating signals sensed by an accelerometer and a gyroscope sensor with a Global Positioning System (GPS) signal including latitude, longitude and time, and configured to receive three-dimensional (3D) image information corresponding to the situation information; and a control server configured to receive the situation information, configured to generate the 3D image information about a current location of the mobile terminal by matching the location information of the situation information with pre-stored map information or architectural drawing information, and configured to transmit the 3D image information to the mobile terminal.

In one embodiment, the mobile terminal comprises a video-audio input unit configured to generate the video and/or audio information using at least one of a capturing module or a recording module; a location information input unit configured to generate the location information, in which the signals sensed by the accelerometer and the gyroscope sensor are integrated with the GPS signal including latitude, longitude and time, by using at least one of a GPS reception module or an Inertial Navigation System (INS) module; a storage unit configured to store the situation information; a communication unit configured to transmit the situation information to the control server and configured to receive the 3D image information from the control server; and a display unit configured to display the 3D image information corresponding to the situation information received via the communication unit.

In one embodiment, the control server comprises a location information processing unit configured to generate the 3D image information required to detect the current location of the mobile terminal by matching the location information of the situation information with the pre-stored map information or architectural drawing information; a storage unit configured to store the 3D image information and the video and/or audio information of the situation information; and a communication unit configured to receive the situation information from the mobile terminal and configured to transmit the 3D image information to the mobile terminal.

In one embodiment, the mobile terminal and the control server use at least one of communication methods, including Wireless Local Area Network LAN (WiFi), High Speed Downlink Packet Access (HSDPA), High Speed Uplink Packet Access (HSUPA), Wireless Broadband (WiBro), Code Division Multiple Access (CDMA), and Global System for Mobile Telecommunication (GSM)-based communication methods.

In one embodiment, the mobile terminal further comprises an external input/output unit configured to enable short-range data exchange in addition to wireless communication.

According to another aspect of the present invention, provided is a field monitoring method using a mobile terminal, comprising: generating, by the mobile terminal, video and/or audio information by capturing video and/or sound of a field, and generating, by the mobile terminal, location information by integrating signals sensed by an accelerometer and a gyroscope sensor with a Global Positioning System (GPS) signal including latitude, longitude and time; and generating, by a control server, 3D image information about a current location of the mobile terminal by matching the location information of the situation information with pre-stored map information or architectural drawing information, and transmitting the 3D image information to the mobile terminal.

DESCRIPTION OF PREFERRED EMBODIMENTS

The above and other objects, features and advantages of the present invention will be more clearly understood from the following detailed description taken in conjunction with the accompanying drawings. It should be noted that, in the following description of the present invention, detailed descriptions of well-known functions and structures incorporated herein may be omitted to avoid obscuring the subject matter of the present invention.

Figure 1:
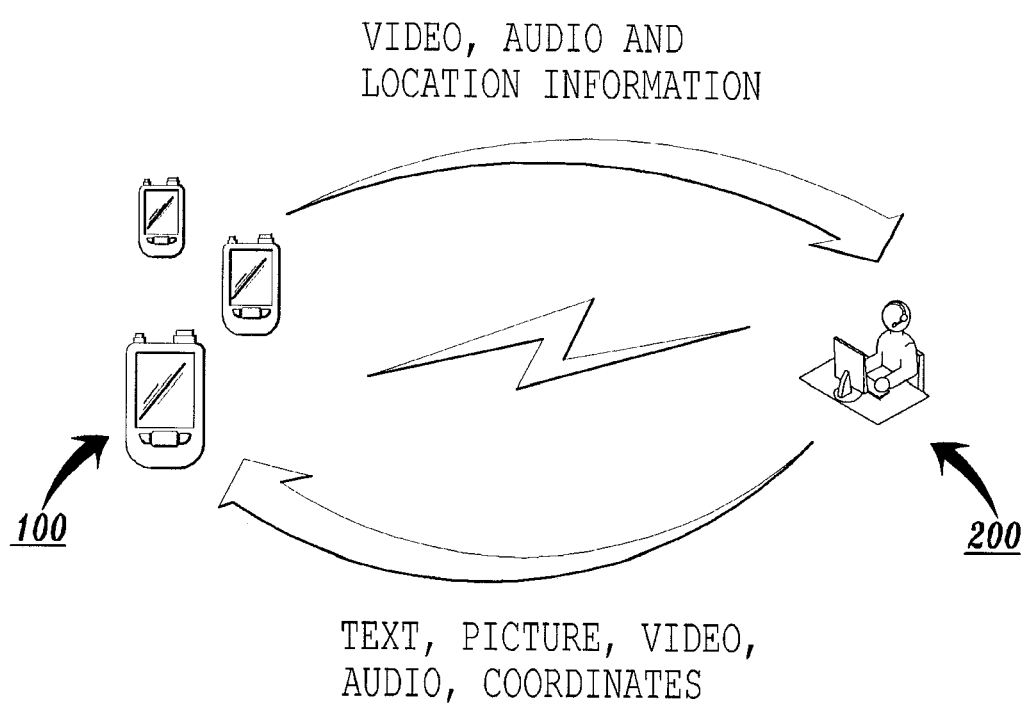
FIG. 1 is a diagram showing a schematic construction of a field monitoring system using a mobile terminal according to an embodiment of the present invention.

FIG. 1 is a diagram showing a schematic construction of a field monitoring system using a mobile terminal according to an embodiment of the present invention.

As shown in FIG. 1, the field monitoring system using the mobile terminal according to an embodiment of the present invention includes at least one mobile terminal 100 for generating and transmitting situation information, which includes video and/or audio information and location information about a field of interest, and a control server 200 for receiving the situation information from the mobile terminal 100, generating three-dimensional (3D) image information about a current location of the mobile terminal 100 by matching the location information included in the situation information with pre-stored map information or architectural drawing information, and transmitting the 3D image information to the mobile terminal 100.

The above-described field monitoring system using the mobile terminal will be described in detail below with reference to FIGS. 2 and 3.

Figure 2:
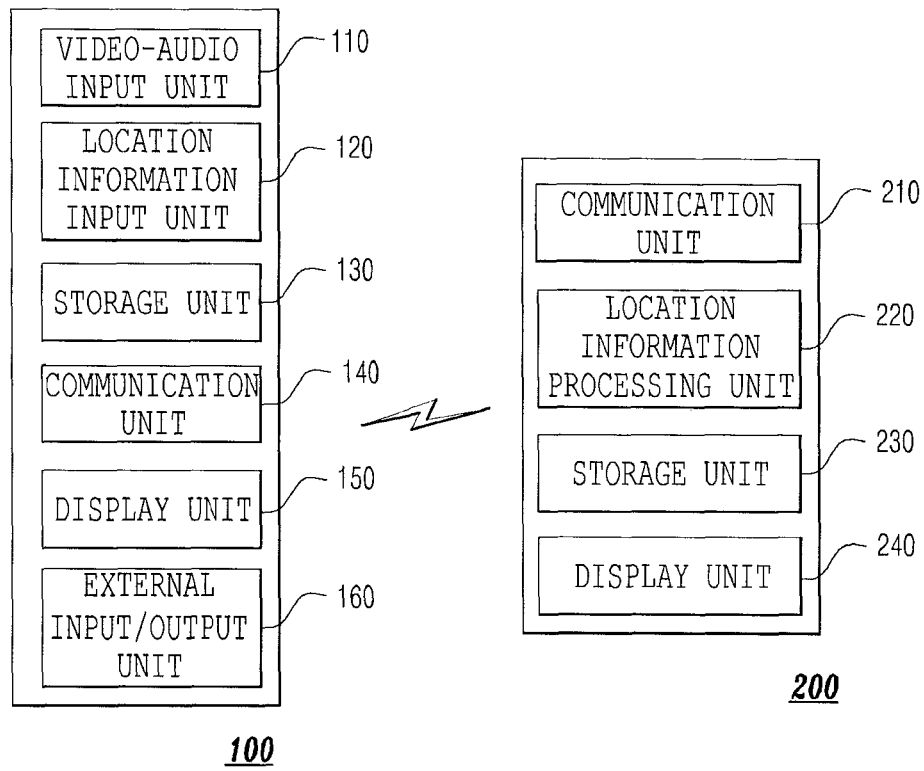
FIG. 2 is a diagram showing a detailed construction of a field monitoring system using a mobile terminal according to an embodiment of the present invention.
Figure 3:
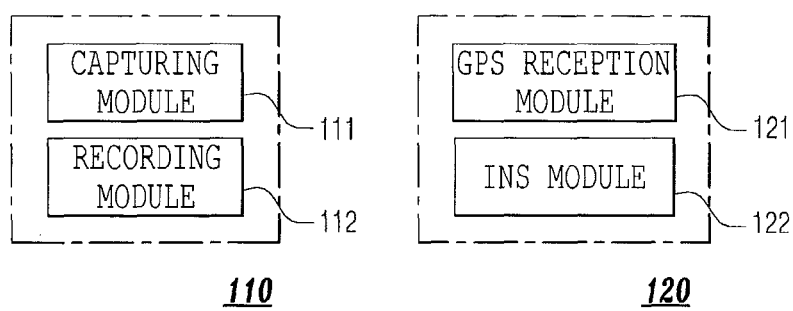
FIG. 3 is a diagram showing a detailed construction of a video-audio input unit and a location information input unit of a mobile terminal according to an embodiment of the present invention.

FIG. 2 is a diagram showing a detailed construction of the field monitoring system using a mobile terminal according to an embodiment of the present invention, and FIG. 3 is a diagram showing a detailed construction of a video-audio input unit and a location information input unit of the mobile terminal according to an embodiment of the present invention.

As shown in FIG. 2, the mobile terminal 100 of the field monitoring system according to an embodiment of the present invention includes a video-audio input unit 110 for generating the video and/or audio information of the field of interest using a video capturing module and a recording module, a location information input unit 120 for generating the location information, which is produced by integrating signals sensed by an accelerometer and a gyroscope sensor with a Global Positioning System (GPS) signal including latitude, longitude and time, by using a GPS reception module and an inertial navigation system (INS) module, a storage unit 130 for storing the situation information, a communication unit 140 for transmitting the situation information to the control server 200 and receiving the 3D image information from the control server 200, and a display unit 150 for displaying the 3D image information corresponding to the situation information received through the communication unit 140.

As shown in FIG. 3, the video-audio input unit 110 is used to generate the video and/or audio information using a capturing module 111 and a recording module 112.

Further, the location information input unit 120 is used to generate the location information, which is produced by integrating the signals sensed by the accelerometer and the gyroscope sensor with the GPS signal including latitude, longitude and time, by using the GPS reception module 121 and the INS module 122.

The storage unit 130 is used to store the location information and the video and/or audio information.

Further, the communication unit 140 is used to transmit the video and/or audio information and the location information stored in the storage unit 140 to the control server 200 and receive situation handling information corresponding to the information transmitted from the control server 200. The communication unit 140 may perform wireless communication with the control server 200 using wireless communication methods such as Wireless Local Area Network (WiFi), High Speed Downlink Packet Access (HSDPA), High Speed Uplink Packet Access (HSUPA), Wireless Broadband (WiBro), Code Division Multiple Access (CDMA) and Global System for Mobile Telecommunication (GSM)-based communication methods.

Meanwhile, in the present embodiment, the above wireless communication methods are given herein as examples of the communication methods of the mobile terminal 100; however, it is not intended to limit the scope of the present invention. Those skilled in the art will appreciate that the mobile terminal 100 can be compatible with any other communication methods by modifying communication modules to be mounted in the communication unit 140 as far as the communication method is a wireless communication method that can perform data transmission.

Further, the display unit 150 can be used to display the pre-stored information, or the situation handling information received from the control server 200 through the communication unit 140, in the form of video, audio, pictures, text, etc.

Meanwhile, the mobile terminal 100 may further include an external input/output unit 160 to perform, in addition to wireless communication, short-distance data exchange with other mobile terminals, computers or surveillance devices, which are installed and fixed by armies, the police, fire departments, and security companies.

Further, the control server 200 includes a location information processing unit 220 for receiving the situation information from the mobile terminal 100, and generating the 3D image information required to detect the current location of the mobile terminal 100 by matching the location information included in the situation information with the pre-stored map information or the architectural drawing information, a storage unit 230 for storing the 3D image information and the video and/or audio information of the situation information, a display unit 240 for displaying, for example, the received situation information, and a communication unit 210 for receiving the situation information from the mobile terminal 100 and transmitting the 3D image information to the mobile terminal 100.

The location information processing unit 220 generates the 3D image information, which enables tracking of the location of the mobile terminal 100 by matching the location information included in the situation information received through the communication unit 210 with the pre-stored map information or the architectural drawing information.

Further, the storage unit 230 stores the 3D image information, and the video and/or audio information, which is received from the mobile terminal 100 via the communication unit 210.

Next, a field monitoring method performed by the above-described field monitoring system according to an embodiment of the present invention using the mobile terminal 100 will be described with reference to FIG. 4.

Figure 4:
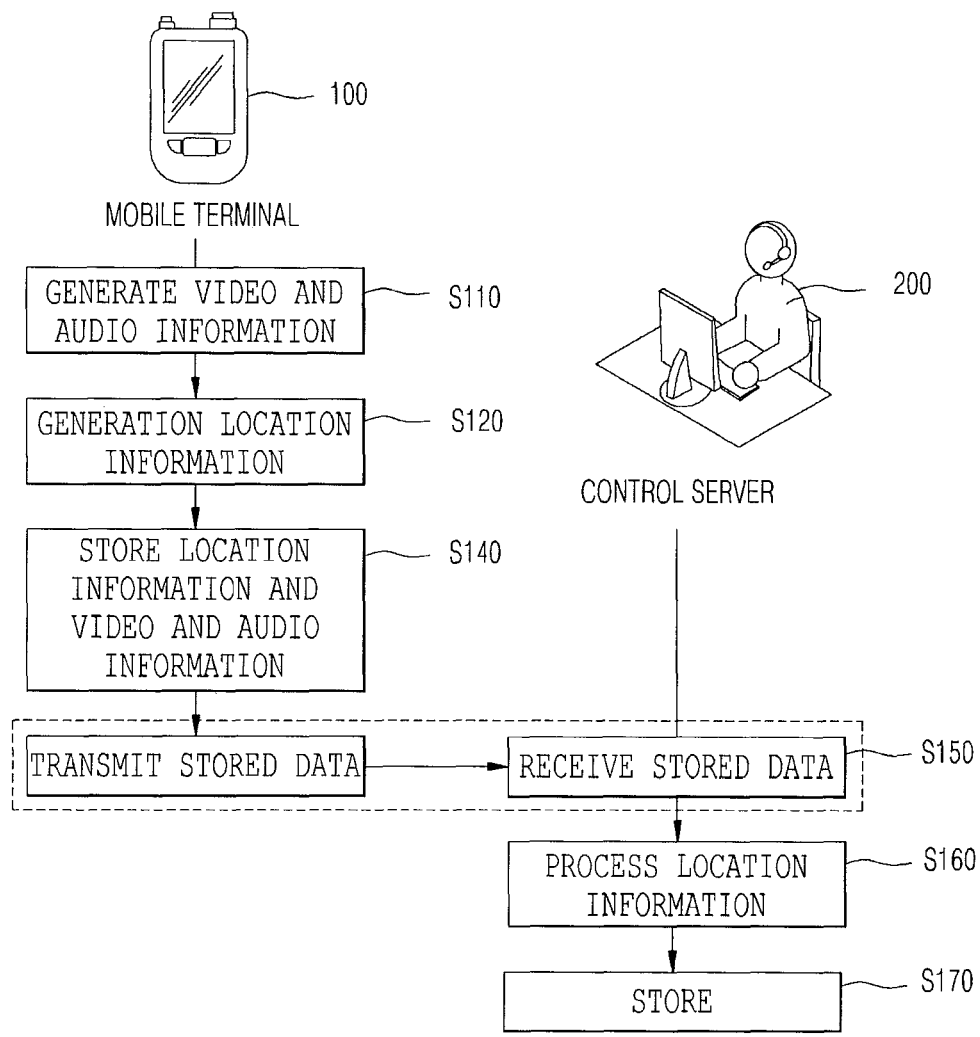
FIG. 4 is a flowchart showing a field monitoring method using a mobile terminal according to an embodiment of the present invention.

FIG. 4 is a flowchart showing a field monitoring method using a mobile terminal according to an embodiment of the present invention.

As shown in FIG. 4, the video-audio input unit 110 generates the video and/or audio information using the capturing module 111 and the recording module 112 at step S110.

Further, the location information input unit 120 receives the GPS signal including latitude, longitude and time via the GPS reception module 121 and the INS module 122, generates signals sensed by the accelerometer and the gyroscope sensor, and generates location information by integrating the sensed signals with GPS coordinate signals at step S120.

Next, the storage unit 130 stores the location information and the video and/or audio information at step S130.

The communication unit 140 transmits the location information and the video and/or audio information to the control server 200, and the communication unit 210 of the control server 200 receives the location information and the video and/or audio information at step S140.

The location information processing unit 220 generates the 3D image information, which enables the tracking of the location of the mobile terminal 100 by matching the location information with the pre-stored map information or the architectural drawing information at step S150.

Further, the storage unit 230 stores the 3D image information and the video and/or audio information received from the mobile terminal 100 via the communication unit 210 at step S160.

Using the above method, the control server 200 can promptly determine a current situation and can formulate plans and instructions on how to handle the situation by, for example, using a display device, and transmit the situation handling information corresponding to the current situation via the communication unit 210, thus enabling the mobile terminal 100 to display the received situation handling information in the form of, for example, video, audio, pictures and text.

According to the present invention, when an emergency situation occurs unexpectedly, a control center can promptly detect the situation of a field via the transmission of video captured in real time.

Further, according to the present invention, the locations of individual members sent into the field can be detected using mobile terminals, each employing a commercialized communication module, a GPS and an INS, even in a case where the incident or the accident occurs over a wide expanse of area. Also, according to the present invention, capturing an image of the accident scene is possible despite the presence of unexpected events or blind spots.

Although the preferred embodiments of the present invention have been disclosed for the purpose of illustrating the technical spirit of the present invention, those skilled in the art will appreciate that the present invention is not limited to the construction and operation illustrated and described in the present specification and various modifications and changes are possible, without departing from the scope and spirit of the invention. Therefore, all suitable modifications and changes and equivalents thereof should be interpreted as being included in the scope of the present invention.

The invention claimed is:

1. A field monitoring system using a mobile terminal, the system comprising:

at least one mobile terminal located in a field, the mobile terminal being configured to transmit situation information which includes video information, audio information and location information, and configured to receive three-dimensional (3D) image information corresponding to the situation information; and a control server located in a control center, the control server being configured to receive the situation information from the mobile terminal, configured to generate the 3D image information corresponding to the situation information, and configured to transmit the 3D image information to the mobile terminal, wherein the mobile terminal includes:
a video-audio input unit configured to generate the video and audio information of the field using a video capturing module and a recording module;
a location information input unit configured to generate the location information including signals sensed by an accelerometer and a gyroscope sensor and integrated with a Global Positioning System (GPS) signal obtained by at least one of a GPS reception module and an Inertial Navigation System (INS) module, the Global Positioning System (GPS) signal including latitude, longitude and time;
a storage unit configured to store the situation information;
a mobile terminal communication unit configured to transmit the situation information to the control server and configured to receive the 3D image information from the control server through a wireless communication means; and
a display unit configured to display the 3D image information thereon, and wherein the control server includes:
a location information processing unit configured to generate the 3D image information by matching the situation information received from the mobile terminal with the pre-stored map information or the architectural drawing information;
a storage unit configured to store the 3D image information and the situation information; and
a control server communication unit configured to receive the situation information from the mobile terminal and transmit the 3D image information generated in the server to the mobile terminal through the wireless communication means.

2. The field monitoring system according to claim 1, wherein the wireless communication means uses at least one of communication methods including Wireless Local Area Network LAN (WiFi), High Speed Downlink Packet Access (HSDPA), High Speed Uplink Packet Access (HSUPA), Wireless Broadband (WiBro), Code Division Multiple Access (CDMA), and Global System for Mobile Telecommunication (GSM)-based communication methods.

3. The field monitoring system according to claim 1, wherein the mobile terminal further comprises an external input/output unit configured to exchange short-range data in addition to wireless communication.

4. The field monitoring system according to claim 1, wherein the control server determines a current situation of the field based on the situation information and transmits situation handling information to the mobile terminal by formulating instructions on how the current situation is to be handled.

5. The field monitoring system according to claim 4, wherein the mobile terminal displays the situation handling information on the display unit thereof in various forms including video, audio, pictures and text.

6. A field monitoring method using a mobile terminal, the method comprising:
generating, by a video-audio input unit of at least one mobile terminal located in a field, video information and audio information of a field,
generating, by a location information input unit of the mobile terminal, location information by integrating signals sensed by an accelerometer and a gyroscope sensor with a Global Positioning System (GPS) signal including latitude, longitude and time;
storing, in a storage unit of the mobile terminal, a situation information including the video information, the audio information and the location information;
transmitting through a wireless communication means, by a mobile terminal communication unit of the mobile terminal, the situation information to a control server located in a control center;
receiving, by a control server communication unit of the control server, the situation information from the mobile terminal;
generating, by a location information processing unit of the control server, 3D image information corresponding to the situation information by matching the location information with pre-stored map information or architectural drawing information,
storing, in a storage unit of the control server, the 3D image information and the situation information;
transmitting through the wireless communication means, by the control server communication unit of the control server, the 3D image information generated in the control server to the mobile terminal;
receiving, by the mobile terminal communication unit of the mobile terminal, the 3D image information from the control server; and
displaying, on a display unit of the mobile terminal, the 3D image information.

7. The field monitoring method according to claim 6, further comprising:
transmitting through the wireless communication means, by the control server, situation handling information to the mobile terminal by formulating instructions on how a current situation is to be handled.

8. The field monitoring method according to claim 7, further comprising:
displaying, on the display unit of the mobile terminal, the situation handling information in various forms including video, audio, pictures and text.

* * * * *